Dec. 31, 1968
W. A. STANLEY
3,419,715
AUTOMOBILE REFLECTORS
Filed May 9, 1966
Sheet 2 of 2
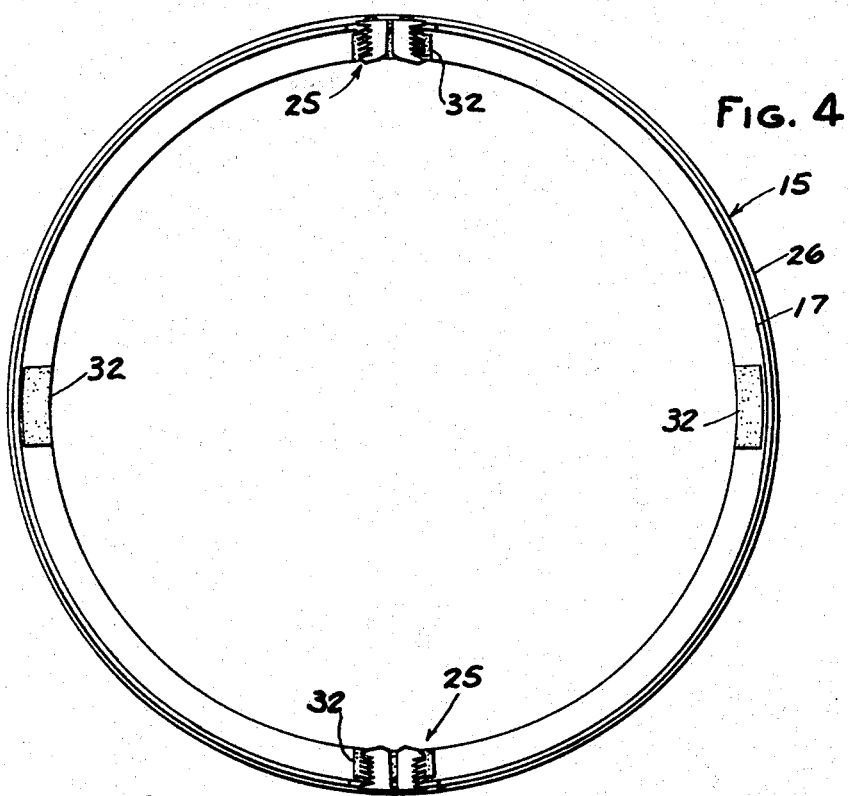
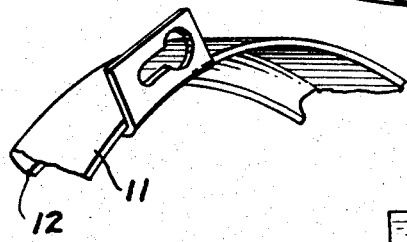
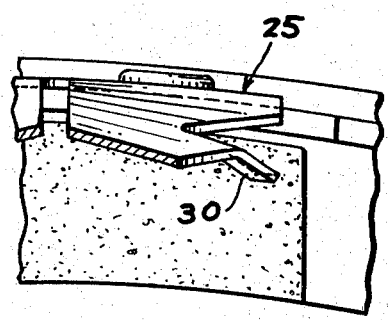
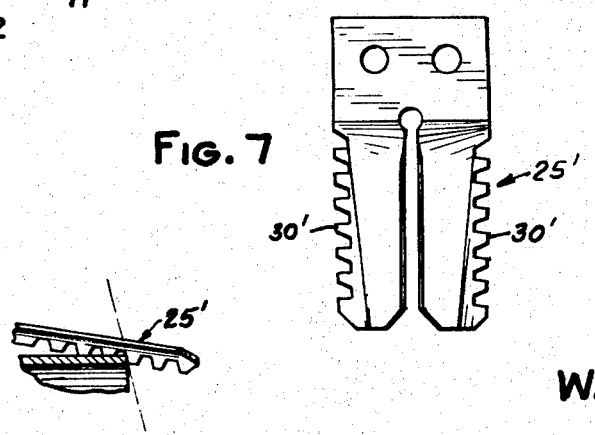
INVENTOR.
WALLACE A. STANLEY
BY
Barnes, Kisselle, Raisch & Choate
ATTORNEYS United States Patent Office  3,419,715
Patented Dec. 31, 1968

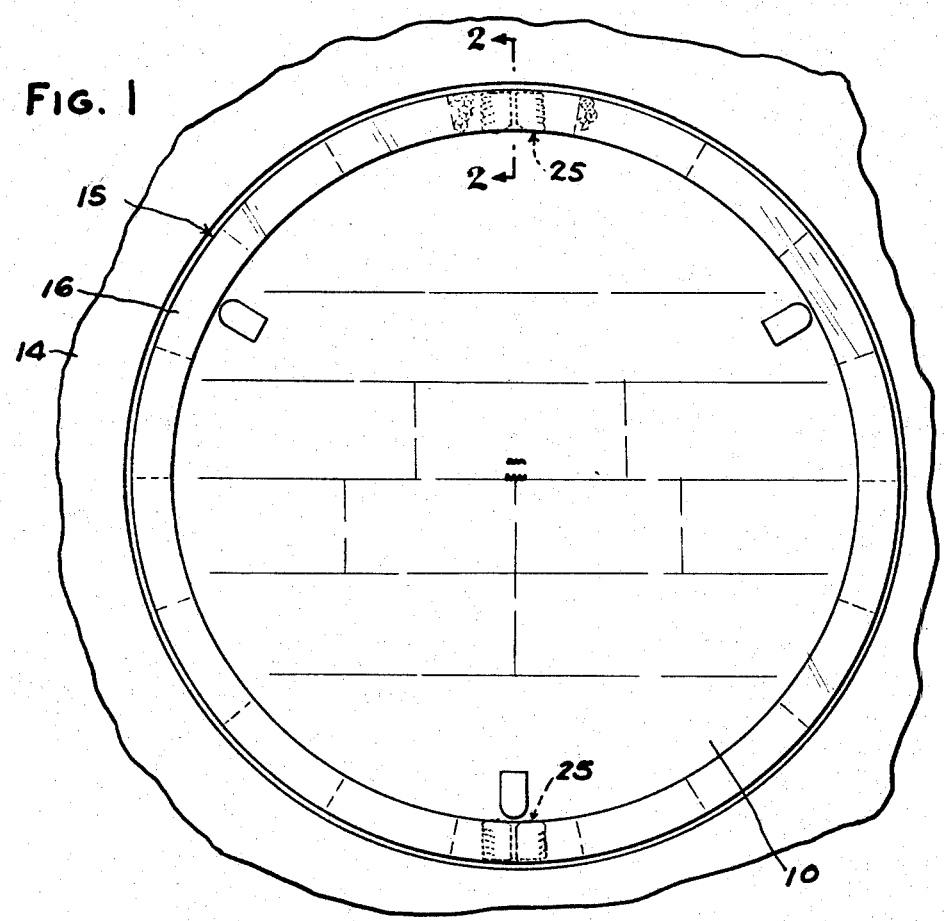
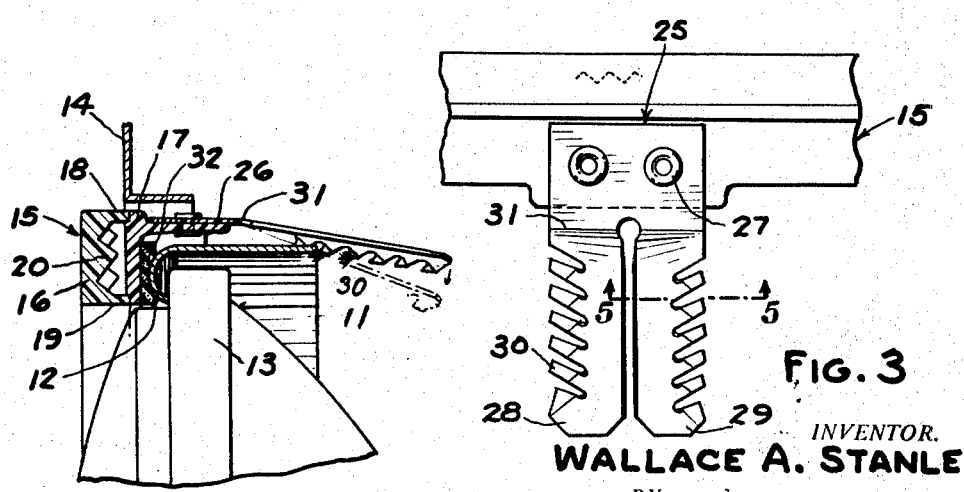

3,419,715
AUTOMOBILE REFLECTORS
Wallace A. Stanley, Bloomfield Hills, Mich., assignor, by mesne assignments, to Reflex Corporation of America, Troy, Mich., a corporation of Michigan
Filed May 9, 1966, Ser. No. 548,643
13 Claims. (Cl. 240—41.55)

ABSTRACT OF THE DISCLOSURE

A reflector for use with a headlamp of an automobile wherein the headlamp has a bracket surrounding the headlamp. The reflector comprises a first substantially continuous ring of transparent material having a smooth outer surface and an inner surface formed with a plurality of reflecting prisms and a second ring of material joined and hermetically sealed to the first ring. A plurality of fingers are mounted in circumferentially spaced relation on the ring and project axially for engaging the bracket. Each of the fingers has serrations extending along opposite longitudinal edges thereof in order to engage the edges of the retaining bracket and accommodate retaining brackets of various axial dimensions.

---

This invention relates to automobile reflectors and particularly to a reflector adapted to be positioned adjacent the headlamp of an automobile.

In the co-pending application of Peter Hedgewick and Wallace A. Stanley, Ser. No. 473,761 filed July 21, 1965, now Patent No. 3,382,354, titled "Reflector for Automobiles," there is disclosed and claimed a reflector which is mounted on the automobile and surrounds the headlamp so that when the headlamp is inoperative, the light from the headlamps of an oncoming vehicle will produce a reflection back to the eyes of the oncoming driver.

Among the objects of the present invention are to provide a reflector of the aforementioned type which has novel means for mounting the reflector on the automobile; which is adapted to be mounted on automobiles of various designs and manufacture; and which can be removed if necessary to adjust or replace the headlamp.

In the drawings:

FIG. 1 is a fragmentary front elevational view of an automobile embodying the invention.

FIG. 2 is a fragmentary sectional view on an enlarged scale taken along the line 2—2 in FIG. 1.

FIG. 3 is a fragmentary plan view of a portion of the reflector shown in FIGS. 1 and 2.

FIG. 4 is a rear elevational view of the reflector.

FIG. 5 is a fragmentary sectional view taken along the line 5—5 in FIG. 3.

FIG. 6 is a fragmentary view of the headlight mounting bracket shown in FIG. 2.

FIG. 7 is a fragmentary plan view of a modified form of the invention.

FIG. 8 is a fragmentary side elevational view of the form of the invention shown in FIG. 7.

Referring to FIG. 1, the reflector embodying the invention is adapted to be mounted on a vehicle which has a conventional sealed beam headlamp 10 that is retained in position by a continuous sheet metal ring or bracket 11. Bracket 11 has a flange 12 that engages a peripheral bead 13 on the headlamp 10. The position of the headlamp with respect to the vehicle is adjusted in accordance with conventional structure, not shown. The conventional construction also includes a sheet metal or plastic bezel or shroud 14 in closely spaced relation to the periphery of the headlamp.

Reflector 15 comprises an outer wall 16 and an inner wall 17 joined by radially spaced walls 18, 19. The outer wall 16 is a continuous ring of light transmitting material, such as acrylic plastic, preferably uncolored and clear, and has a smooth outer surface and an inner surface formed with a plurality of prisms 20 throughout its entire periphery. Each prism 20 is preferably cubic in accordance with the types of prisms shown in the patents to Stimson 1,591,572 and 1,906,655 such that light entering through the flat outer surface of wall 16 is reflected by the three surfaces of each cubic prism 20 back outwardly in a parallel direction. The details of construction and arrangement of the prism are more completely shown and claimed in the aforementioned co-pending patent application Ser. No. 473,761.

The outer wall 16 and associated radially spaced walls 18, 19 are preferably molded in a single piece with prisms 19 along the entire inner surface of the wall 16. The inner wall 17 is formed with a shoulder that engages a recess in the wall and the two walls are joined by adhesive or by spin welding. The inner wall is preferably formed of plastic such as acrylonitrite butadiene styrene.

In accordance with the invention, diametrically opposed fingers 25 are fastened to an annular web 26 extending axially from the inner wall 17 by rivets 27.

Each finger 25 is bifurcated to form finger portions 28, 29. The outer edges of each finger portion are provided with serrations 30 which extend axially and radially toward the ring 15. The body portion of each finger portion 28, 29 is bent along a line 31 so that each finger portion extends generally axially and radially inwardly and is in the broken line position shown in FIG. 2 prior to assembly on the ring or bracket 11. In addition, each finger portion 28, 29 is twisted along its length so that the lowermost or free end of each finger is out of the plane of the base of each finger as shown in FIG. 5. Furthermore, the serrations 30 on one edge are staggered longitudinally with respect to the serrations on the opposite edge as shown in FIG. 3. In addition, the serrations are provided with different spacing between some of the serrations than others. Resilient pads 32 of foam plastic or the like are provided on the inner wall 17.

The reflector is applied to the ring 11 by moving the reflector with the fingers 25 axially inwardly around the ring 11 causing the fingers 25 to flex outwardly. Continued axial movement of the reflector brings the pads 32 into engagement with the flange 12 and the reflector is locked in position by engagement of the serrations 30 with the edge of the ring 11. As the reflector is being moved axially to its final position, successive serrations 30 are engaged with the free edge of the ring 11.

The finger 25 is preferably made of spring metal such as stainless steel. By providing successive serrations, the reflector can be accommodated to rings 11 that have varying axial lengths. In addition, by making the spacing between serrations of different amounts, the serrations can accommodate free edges of the rings 11 which may have beads or other protrusions. Finally, the staggering of the serrations along one edge with respect to the serrations on the other edge provide even more universal accommodation to rings 11 of varying axial lengths.

In the form of the invention shown in FIG. 7, the fingers 25' have serrations 30' that extend in generally the same fashion as shown in FIG. 3 except that the serrations are not symmetrical and the free ends of the serrations are more rounded so that this form of the invention can be more readily removed to replace a headlight or to adjust or otherwise repair the area around the headlight.

I claim:

1. For use with a headlamp of an automobile wherein the headlamp has a bracket surrounding the headlamp, the combination comprising:

a substantially continuous ring of transparent material, said ring having a substantially smooth outer surface and an inner surface formed with a plurality of reflecting prisms such that light passing through said outer surface is reflected by the prisms on said inner surface back out through said outer surface, a second ring of material, means for joining said first and second rings to provide a hermetically sealed unit with said second ring in spaced adjacent relation to said first ring, and a plurality of fingers mounted in circumferentially spaced relation on said ring and projecting axially thereof for engaging the bracket, each of said fingers having serrations extending along opposite longitudinal edges thereof in order to engage the edges of said retaining bracket and accommodate retaining brackets of various axial dimensions.

2. The combination set forth in claim 1 wherein each said finger has the free end thereof extending generally axially and radially inwardly in the untensioned state.

3. The combination set forth in claim 1 wherein each said finger is bifurcated to form two portions, each said portion having the aforementioned serrations on the outer edges thereof.

4. The combination set forth in claim 1 wherein said serrations are inclined and extend toward said ring.

5. The combination set forth in claim 1 wherein said serrations have rounded side edges to facilitate removal of the ring.

6. The combination set forth in claim 1 wherein said serrations on one edge are staggered longitudinally with respect to the serrations on the other edge.

7. The combination set forth in claim 1 wherein some of the serrations on at least one edge are spaced from one another different distances.

8. The combination set forth in claim 1 wherein each said finger is bifurcated, the serrations on one edge being provided on one finger and the serrations on the other edge being provided on the other finger, each said bifurcated portion being twisted about the longitudinal axis in a direction to cause said serrations to follow a line which extends axially and radially inwardly to a greater extent than the remaining part of the bifurcated portion.

9. For use with a headlamp of an automobile wherein the headlamp has a bracket surrounding the headlamp, the combination comprising:

a substantially continuous ring of transparent material, said ring having a substantially smooth outer surface and an inner surface formed with a plurality of reflecting prisms such that light passing through said outer surface is reflected by the prisms on said inner surface back out through said outer surface, a second ring of material, integral walls on one said ring joining said first and second rings to provide a hermetically sealed unit with said second ring in spaced adjacent relation to said first ring, and a plurality of flexible spring fingers mounted in circumferentially spaced relation on said ring and projecting axially thereof for engaging the bracket, each said finger extends as the free end thereof extending generally axially and radially inwardly, each of said fingers having serrations extending along opposite edges thereof in order to engage the edges of said retaining bracket and accommodate retaining brackets of various axial dimensions.

10. The combination set forth in claim 9 wherein each said finger is bifurcated, the serrations on one edge being provided on one finger and the serrations on the other edge being provided on the other finger, each said bifurcated portions being twisted about the longitudinal axis in a direction to cause said serrations to follow a line which extends axially and radially inwardly to a greater extent than the remaining part of the bifurcated portion.

11. The combination set forth in claim 9 wherein said serrations are inclined and extend toward said ring.

12. The combination set forth in claim 11 wherein said serrations on one edge are staggered longitudinally of the finger with respect to the serrations on the other edge.

13. The combination set forth in claim 12 wherein some of the serrations on at least one edge are spaced from one another different distances than others of the serrations.

References Cited

UNITED STATES PATENTS

| 1,751,070 | 3/1930 | Boots et al. | 240—8.3 |
| 1,847,134 | 3/1932 | Nikonow | 240—8.3 |
| 2,476,109 | 7/1949 | Neitzel | 240—46.59 |
| 2,539,819 | 1/1951 | Dominick | 240—46.59 |
| 2,798,147 | 7/1957 | Orsatti | 240—8.3 |

NORTON ANSHER, *Primary Examiner.*

R. M. SHEER, *Assistant Examiner.*

U.S. Cl. X.R.

240—103